E. H. SCOTT.
WEEDER.
APPLICATION FILED MAY 27, 1914.
1,141,659.
Patented June 1, 1915.
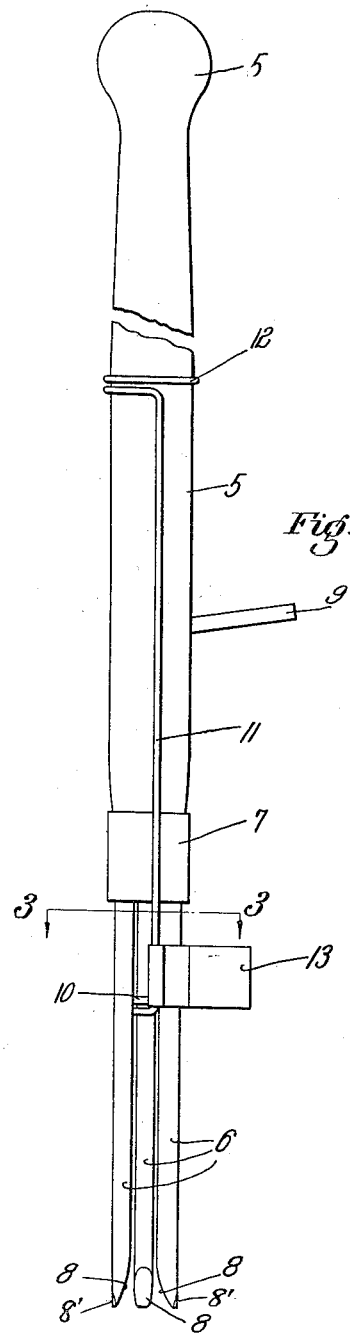
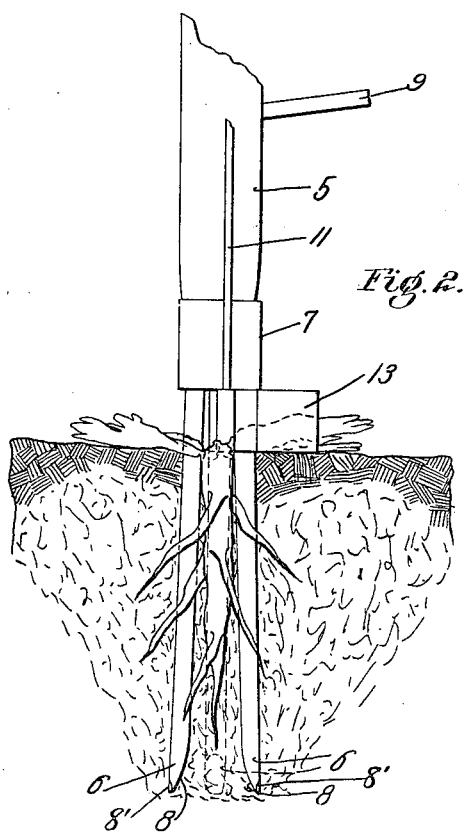

UNITED STATES PATENT OFFICE.

ELTON H. SCOTT, OF SOMERVILLE, MASSACHUSETTS.

WEEDER.

1,141,659.  Specification of Letters Patent.  Patented June 1, 1915.

Application filed May 27, 1914. Serial No. 841,372.

*To all whom it may concern:*

Be it known that I, ELTON H. SCOTT, a citizen of the United States, residing at Somerville, in the county of Middlesex and State of Massachusetts, have invented new and useful Improvements in Weeders, of which the following is a specification.

This invention relates to improvements in weeders and has for its object to provide a strong, durable and inexpensive device adapted to be forced into the earth about the roots of weeds and upon the withdrawal thereof from said earth to extract the roots of the weed therewith.

The invention consists in the combination and arrangement of parts set forth in the following specification and particularly pointed out in the claims.

Referring to the drawings: Figure 1 is a side elevation of a weeder embodying my invention with portions of the handle thereof broken away to save space in the drawings. Fig. 2 is a detail view of the lower portion of the weeder illustrated in Fig. 1 forced into the earth around the root or weed which is to be extracted thereby. Fig. 3 is a transverse section taken on the line 3—3 of Fig. 1.

Like numerals refer to like parts throughout the several views of the drawings.

In the drawings, 5 is a handle which may be constructed in any suitable form to best suit the persons using the same, but preferably said handle is made substantially straight with a knob at its upper end by means of which the same may be firmly gripped. A plurality of prongs 6—6 preferably three in number and arranged substantially parallel one to the other project from the lower end of the handle 5 for a substantial distance, said handle being reinforced at its lower end by a metallic ferrule 7. The prongs 6 are constructed of flexible material such as steel and are preferably cylindrical in shape. The lower ends of said prongs are cut diagonally to form outwardly inclined beveled faces 8 and inwardly inclined beveled faces 8' of less area and extent than are the faces 8, whereby the points or extremities of each of said prongs will lie outside of a plane containing the median axial line of said prong, or in other words, said extremities will lie intermediate a plane containing the median axial line of their respective prongs and the outer face thereof. A foot piece 9 preferably consisting of a pin extending laterally adjacent the lower end of the handle 5 constitutes means whereby said prongs may be forced by the foot into the earth surrounding the weed to be removed and permitting a much greater pressure being applied to said handle than would be possible by the hands alone.

A frame 10 preferably constructed of wire is constructed to interlock with the prongs 6 and to be moved longitudinally of said prongs to remove therefrom the roots or weeds which are removed or extracted by the device, said frame having oppositely disposed wires 11 extending longitudinally of the handle 5 and terminating in a coil 12 which surrounds said handle and constitutes a guide for said frame. The coil 12 is adapted to slide on the lower portion of said handle and the movements thereof are limited by the footpiece 9 which, in other words, constitutes a stop for said slide.

A footpiece 13, preferably of sheet metal, is attached to the wire frame 10 adjacent its lower end, said footpiece being adapted to be engaged by the foot of the operator and depressed to cause the frame 10 to remove the weeds from between the prongs 6 after the device has been withdrawn from the earth.

The operation of the device hereinbefore specifically described is as follows: The prongs 6 are positioned so that they surround the root of the weed to be extracted. The foot of the operator is then placed upon the footpiece 9 and pressure applied to force said prongs into the earth around said root. As the prongs penetrate the earth the inclined faces 8, due to the pressure applied to the footpiece 9, cause said prongs to be outwardly deflected, as illustrated in Fig. 2, the faces 8' serving to slightly retard the deflection of said prongs, while the footpiece 13 and frame 10 will be moved to their uppermost positions as will also be seen in said figure. After the prongs have been forced into the earth as far as the footpiece 13 will permit, the handle is directly withdrawn without twisting or turning the same with the result that the earth above the deflected prongs owing to the divergence of the holes occupied by said several prongs which serve as wedges to force the free ends of said prongs toward each other, thereby firmly grips the root contained within the series or group of prongs and insures said root being withdrawn or extracted therewith.

Having thus described my invention what I claim and desire by Letters Patent to secure is:

1. A weeder having, in combination, a handle, and a plurality of parallelly arranged prongs projecting from one end of said handle, the extremities of said prongs having outwardly and inwardly inclined beveled faces, said inwardly inclined faces being of less area and extent than said outwardly inclined faces whereby the points of said prongs will each lie outside of a plane containing the median axial line of its prong.

2. A weeder having, in combination, a handle, a plurality of parallelly arranged prongs projecting from one end of said handle, a footpiece on said handle by means of which said prongs may be moved to penetrate the earth, said prongs having outwardly and inwardly inclined faces of large and small areas respectively at their extremities whereby the extremity of each prong will lie intermediate a plane containing the median axial line of its prong and the outer faces thereof, said outwardly inclined faces being adapted to cause a divergence of the free ends of the prongs during the penetration of the earth by said prongs, said inwardly inclined faces being adapted to retard the diverging of said prongs.

3. A weeder having, in combination, a handle, a plurality of parallelly arranged prongs projecting from one end of said handle, the outer extremities of said prongs having outwardly inclined beveled faces, said outer extremities of said prongs also having inwardly inclined beveled faces of substantially less area and extent than said outwardly inclined faces whereby the extremity of each prong will lie intermediate a plane containing the median axial line of its prong and the outer face thereof, and a footpiece slidable longitudinally of said prongs adapted to be moved by foot pressure to remove the weeds from said prongs.

4. A weeder having, in combination, a handle, a plurality of prongs projecting from one end of said handle, the free ends of said prongs having outwardly inclined beveled faces, a footpiece arranged to slide longitudinally of said prongs to remove weeds therefrom, and a footpiece on said handle by means of which said prongs may be forced into the earth, said latter footpiece constituting a stop for said movable footpiece.

5. A weeder having, in combination, a handle, a plurality of prongs projecting from one end of said handle, the free ends of said prongs having outwardly inclined beveled faces, a wire frame interlocking with said prongs, a portion of the wire thereof extending upwardly and encircling said handle, and a footpiece on said frame by means of which weeds may be removed from said prongs.

6. A weeder having, in combination, a handle, a plurality of prongs projecting from one end of said handle, the free ends of said prongs having outwardly inclined beveled faces, a wire frame interlocking with said prongs, a portion of the wire thereof extending upwardly and encircling said handle, and a stop on said handle adapted to engage the portion of said wire encircling said handle to limit the movements of said frame longitudinally of said prongs.

In testimony whereof I have hereunto set my hand in presence of two subscribing witnesses.

ELTON H. SCOTT.

Witnesses:
CHARLES S. GOODING,
SYDNEY E. TAFT.

Copies of this patent may be obtained for five cents each, by addressing the "Commissioner of Patents, Washington, D. C."